L. S. WOODSIDE.
CHECK-ROW ATTACHMENTS FOR CORN-PLANTERS.
No. 193,743.  Patented July 31, 1877.
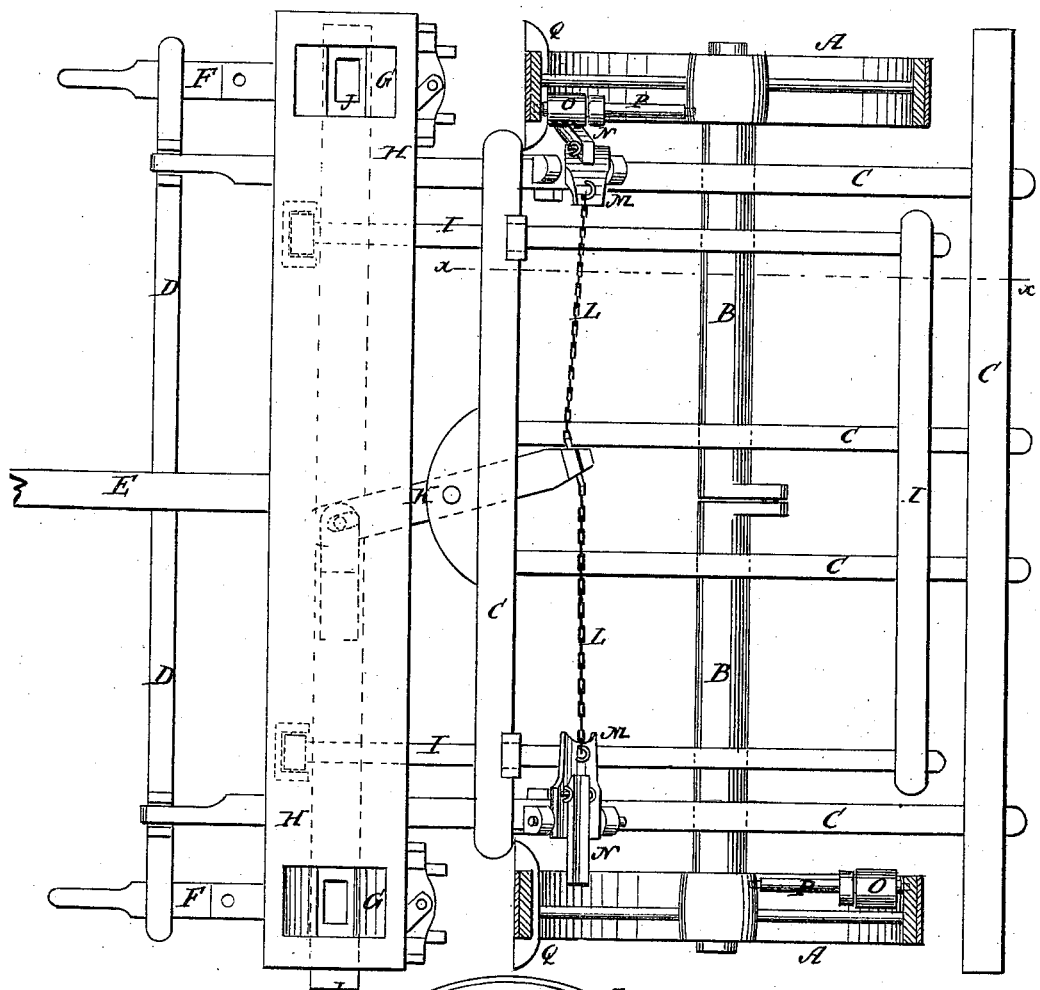
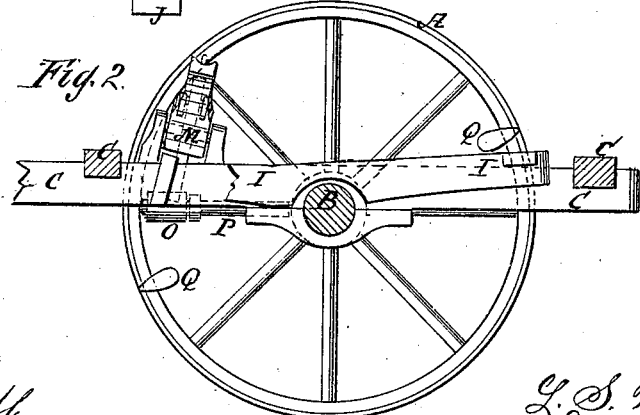
WITNESSES:
E. Wolff
J. H. Scarborough
INVENTOR:
L. S. Woodside
BY
ATTORNEYS.

UNITED STATES PATENT OFFICE.

LEWIS S. WOODSIDE, OF RIVERTON, IOWA, ASSIGNOR TO HIMSELF AND MORRIS S. SOBER, OF SAME PLACE.

IMPROVEMENT IN CHECK-ROW ATTACHMENTS FOR CORN-PLANTERS.

Specification forming part of Letters Patent No. 193,743, dated July 31, 1877; application filed April 9, 1877.

*To all whom it may concern:*

Be it known that I, LEWIS SAMUEL WOODSIDE, of Riverton, in the county of Fremont and State of Iowa, have invented a new and useful Improvement in Check-Row Attachments for Corn-Planters, of which the following is a specification:

Figure 1 is a top view of a corn-planter to which my improvement has been applied. Fig. 2 is a detail vertical section of the same taken through the line $x\,x$, Fig. 1.

Similar letters of reference indicate corresponding parts.

The object of this invention is to furnish an improved attachment for corn-planters, which shall be so constructed as to enable the seed to be planted in accurate check-row without its being necessary to mark the ground in any way.

The invention consists in the combination of the two chains, the two pairs of hinged blocks, and the wheels or rollers with the lever that operates the seed-dropping slide, and with the driving-wheels and their axles.

A are the wheels, which are rigidly attached to the journals of the axle B. The axle B revolves in bearings attached to the frame C, and is made in two parts, coupled together at their inner ends by lugs and pins, as shown in Fig. 1, or by any other convenient detachable coupling, to enable the machine to be turned around without one of the wheels having to slide upon the ground.

The forward ends of the side bars of the frame C project, and to their forward ends is hinged the frame D, to which the tongue E, runners F, and seed-hoppers G are attached. The tops of the hoppers G are connected by a board, H.

To the frame D is hinged the forward end of the frame I, which is hinged to the front cross-bar of the frame C, so that the runners F may be conveniently raised from the ground when desired.

J is the slide by which the seed is removed from the hoppers G and dropped to the ground, and which is provided with two dropping-holes in each end, so that each end may drop a hill at each movement of the slide.

To the middle part of the dropping-slide J is pivoted the forward end of the lever K, which is pivoted to the front bar of the frame C, or to a support attached to said front bar.

To the rear end of the lever K are attached the inner ends of two chains or jointed rods, L, the outer ends of which are attached to the inner ends of two blocks or arms, M, the outer ends of which are hinged to the side bars of the frame C.

To the middle part of the blocks or arms M are hinged the inner ends of the blocks or arms N, the outer ends of which, when turned down, project so as to be struck by the wheels or rollers O, revolving upon the bars P. The inner ends of the bars P are attached to the hubs, and their outer ends are attached to the rims of the wheels A.

One of the rollers O is attached to each wheel A, and the two rollers are placed upon the opposite sides of the axle B, so that the dropping-slide J may be moved twice at each revolution of the wheels A. The circumference of the wheels A should be exactly equal to twice the required distance between the hills.

By turning the upper blocks N up into a vertical position the rollers O cannot strike them, and the machine may be drawn forward without operating the seed-dropping device.

To the rim of each of the wheels A are attached two cross-blocks, Q, in such positions as to mark the ground directly over each hill, to serve as guides to the driver and enable him to plant the field in accurate check-rows. Should the wheels not be in the right position when starting in at the side of the field, they may be turned by hand to bring them into the proper position.

Having thus described my invention, I claim as new and desire to secure by Letters Patent—

The combination of the two chains or jointed rods L, the two pairs of hinged blocks M N, and the wheels or rollers O with the lever K, that operates the seed-dropping slide J, and with the wheels A and axle B, substantially as herein shown and described.

LEWIS SAMUEL WOODSIDE.

Witnesses:
MOSES SAMUELS,
JOHN COOPER.